United States Patent Office 2,967,208
Patented Jan. 3, 1961

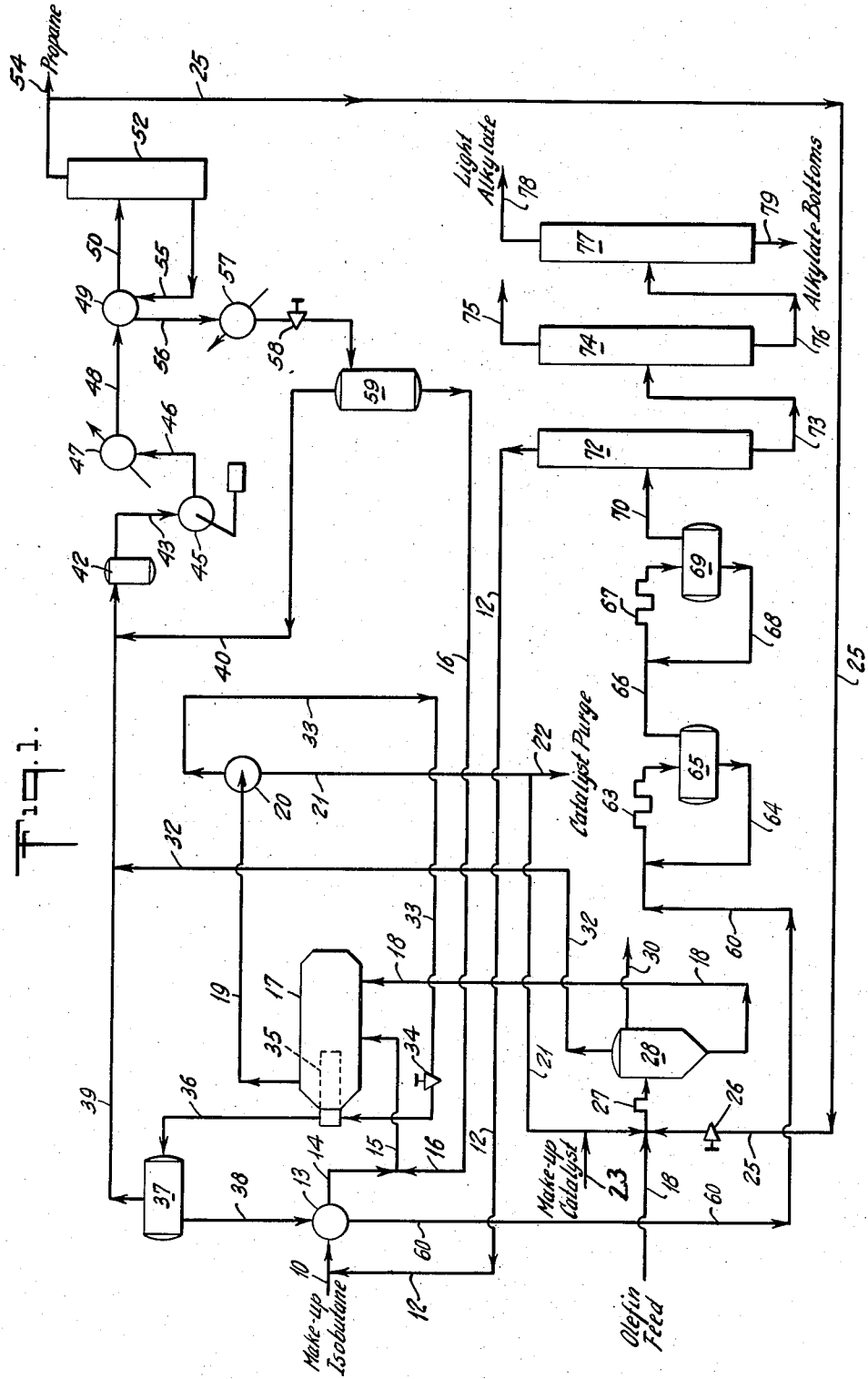

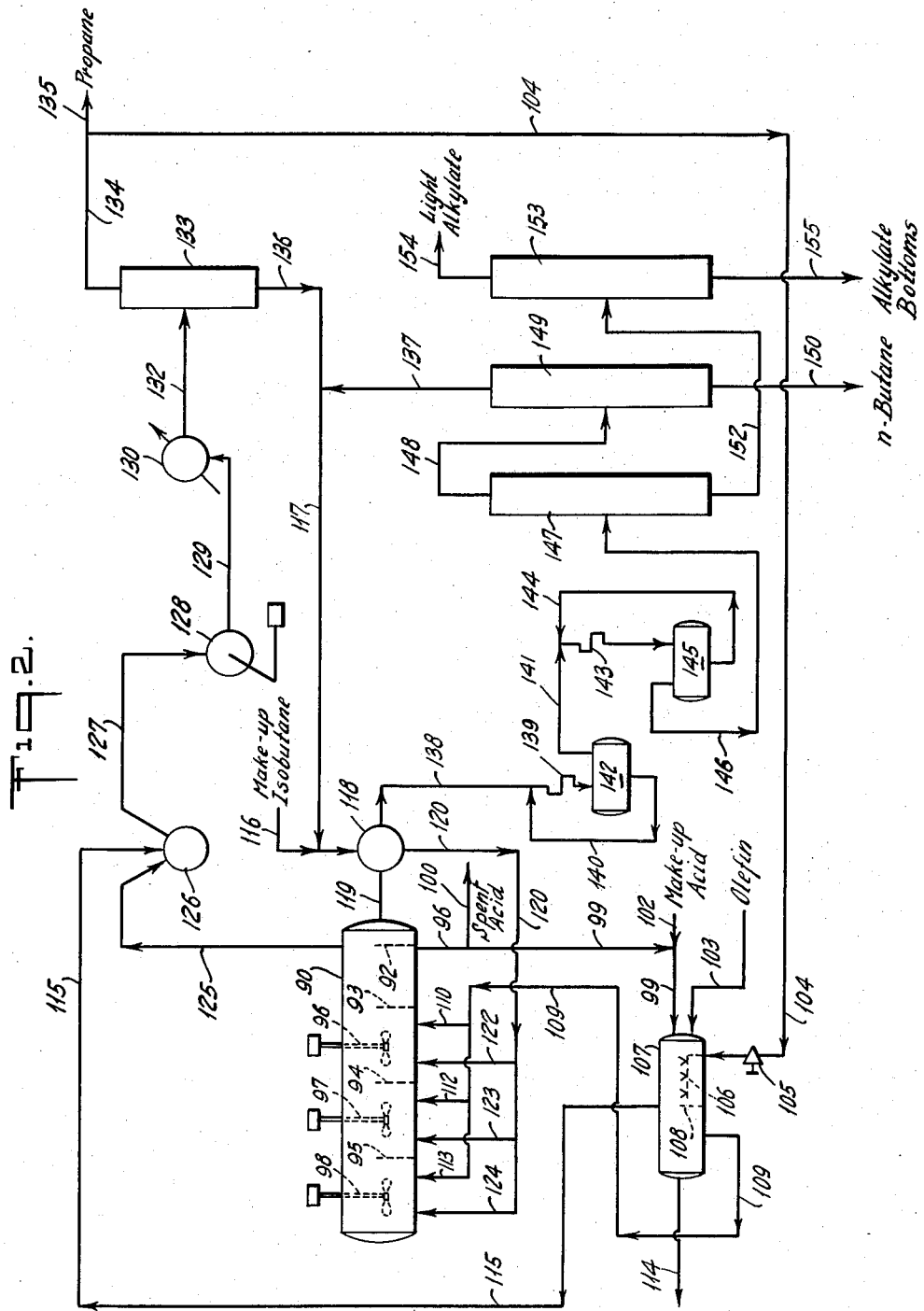

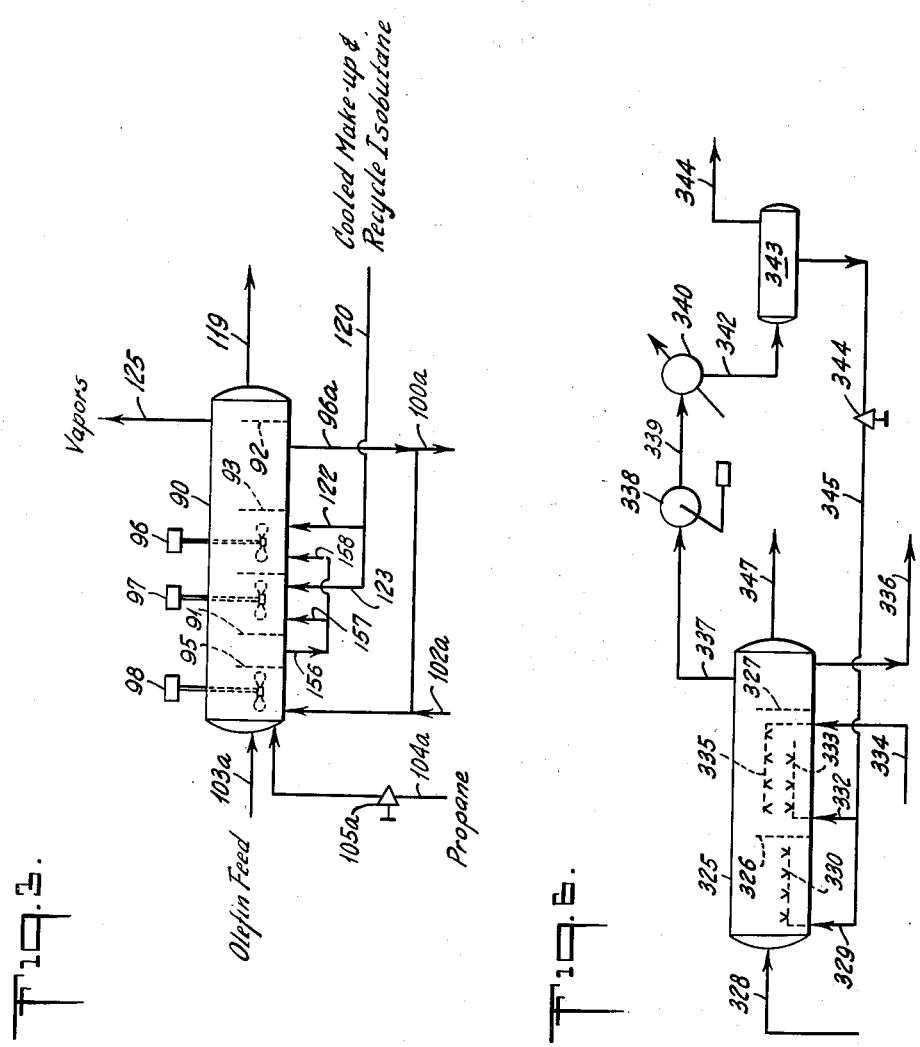

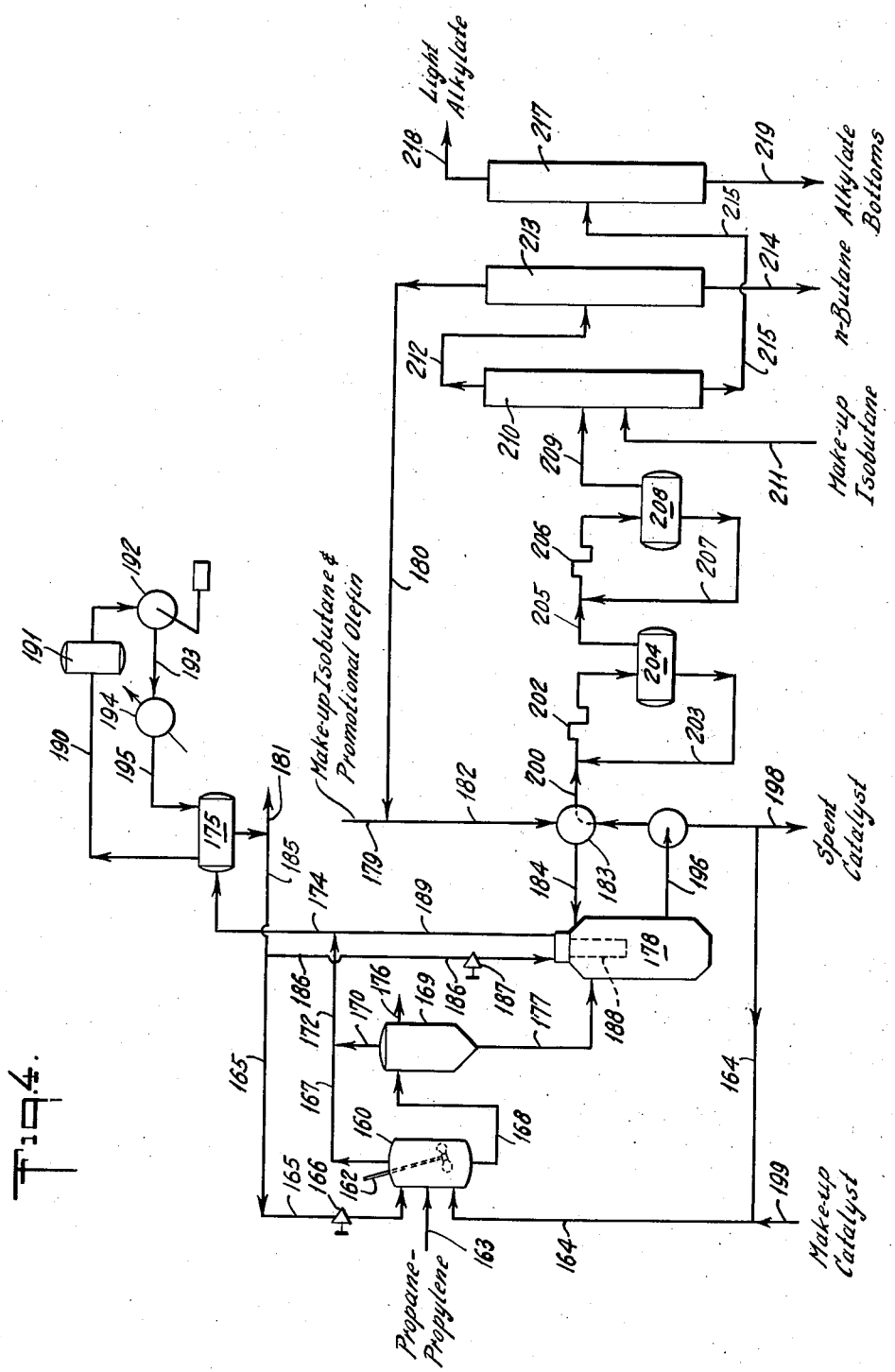

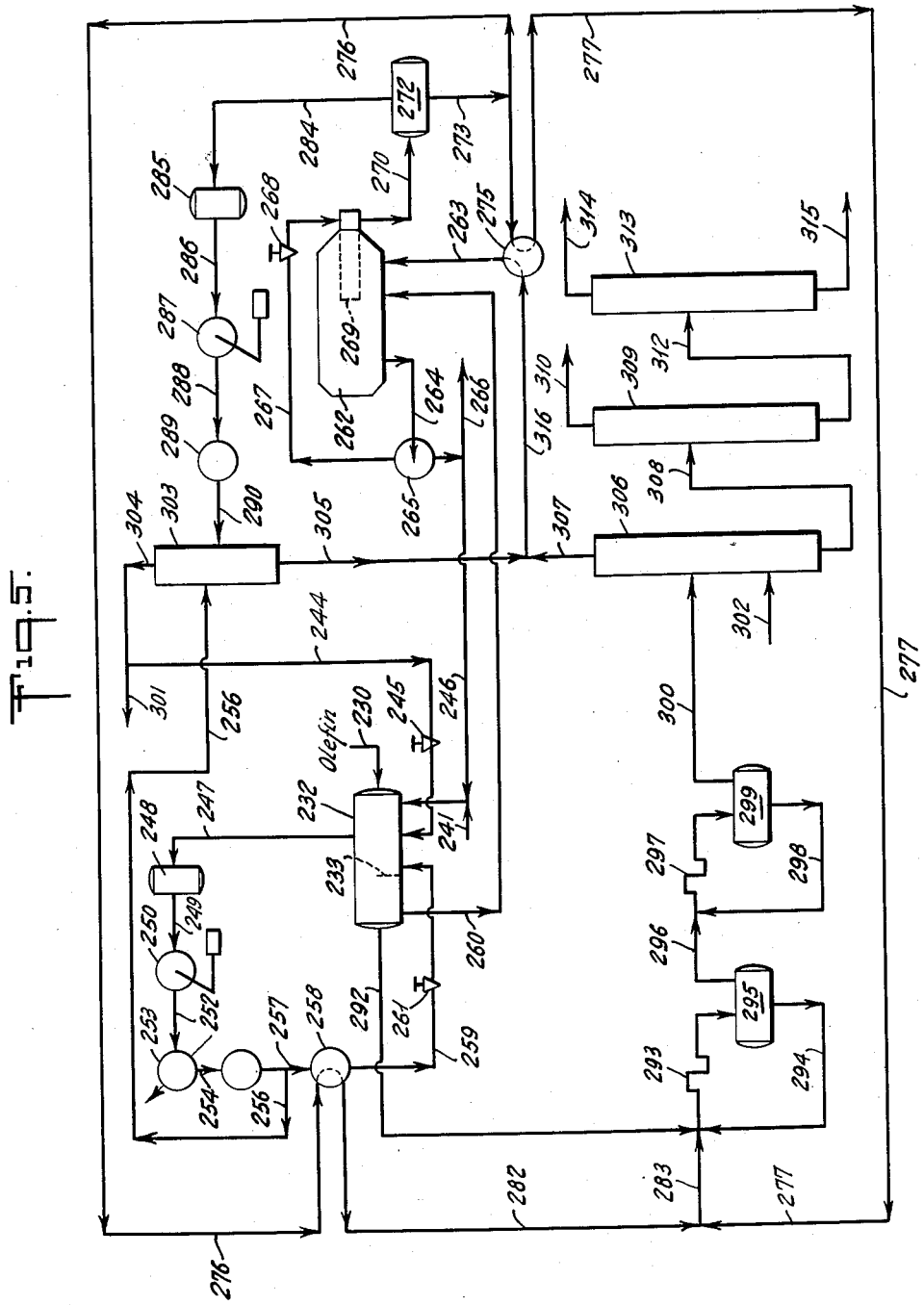

2,967,208

TWO-STAGE ALKYLATION PROCESS

Frank A. Clauson, Roslyn Heights, N.Y., and David K. Beavon, Darien, Conn., assignors to Texaco Inc., a corporation of Delaware Filed July 11, 1958, Ser. No. 748,003

3 Claims. (Cl. 260—683.61)

This invention relates to isobutane-olefin alkylation with an acid catalyst, e.g. sulfuric acid, and more particularly to a two stage alkylation process of this type.

In a two stage olefin-isobutane alkylation process the first stage broadly comprises absorbing the olefinic hydrocarbon reactant in recycled acid catalyst from the second stage of the process, and the second stage broadly comprises contacting the olefin-acid solution with the isoparaffin in an alkylation zone under alkylation conditions. The most satisfactory olefins for the process are of low molecular weight, i.e. propylene and butylenes.

Operation of such two stage alkylation process provides a method for eliminating paraffins, i.e., normal and isoparaffins, from the olefin feed before introducing it into the alkylation zone and for distributing the alkylation cooling load onto an additional step. To be practical, the first stage must not give rise to an excessive amount of degradation products, e.g. olefin polymers, tars, or the like. The first stage $C_3+$ olefin absorption should be practically complete for greatest economy. Average contact time between olefin and catalyst in the first stage is generally to be maintained short, e.g. below 15 minutes and, advantageously, below 5 minutes.

In the second stage of the reaction ordinarily a preponderance of isobutane over all other hydrocarbons (and hydrocarbon equivalent of the olefin-acid feed from the first stage) is maintained for highest quality output, the isobutane concentration generally being 70-80 mol percent of the reaction zone content, exclusive of free and combined acid catalyst. The second stage temperatures are ordinarily desirably low, ordinarily below about 75° F. and advantageously between about 30° and 55° F. Such temperature in the second stage can be maintained either by autorefrigeration of that zone or by effluent refrigeration applied to that zone, or even by closed circuit refrigeration wherein a volatile substance such as a hydrocarbon or ammonia is the refrigerant.

In an effluent refrigeration system the output of the second stage alkylation zone is separated into a hydrocarbon phase and a liquid catalyst phase, the separated hydrocarbon phase is passed into a flash zone of low pressure wherein low paraffins, including some of the isobutane present, are vaporized with concomitant cooling of the remaining liquid hydrocarbons including alkylate, and at least a part of the remaining liquid hydrocarbons are used to refrigerate the alkylation zone indirectly. In such operation, the alkylation zone and effluent separator are maintained under sufficient pressure to keep all components in liquid phase. Flashing in a flash zone as referred to herein denotes the practically adiabatic forming of chilled vapors and residual liquid by reduction of pressure on a liquid comprising hydrocarbon material.

In autorefrigeration the lower boiling hydrocarbons including some of the isobutane present are evaporated directly from the contents of the second stage (alkylation) reaction zone to cool it.

Other alkylation reaction conditions include use of a mol ratio of isobutane to olefin supplied to the overall alkylation process (and including all recycled flows of isobutane) substantially above about 1:1 and generally between about 4:1 and about 10:1, use of a hydrocarbon (measured as liquid phase hydrocarbon) to liquid catalyst volume ratio between about 0.2:1 and 5:1 and preferably about 1:1, and use of alkylation strength catalyst, e.g. sulfuric acid of at least about 88% strength, HF of at least about 85% titratable acidity, or an aluminum chloride-hydrocarbon complex liquid catalyst, one having an active aluminum chloride content (expressed as equivalent aluminum) of at least about 15 weight percent. Advantageously, the catalyst will be a liquid catalyst nonvolatile under the reaction conditions, and preferably it will be sulfuric acid maintained between about 88 to about 98% strength.

It has been found for suppressing polymer formation and for obtaining the best quality alkylate that the first stage of the operation should be operated at a low temperature, suitably below 35° F., but, of course, not so cold that the acid tends to freeze. Heretofore it has been proposed to prepare the acid for the recycle to the first stage by subjecting it to low absolute pressures whereby hydrocarbon, principally isobutane, is stripped therefrom to minimize formation of degradation products. Suitable molal olefin:acid feed ratios to the first stage decrease from about 1:1, are preferably between about 0.4:1 and 0.9:1, and can even be lower, e.g. 0.1:1 and less.

There are major obstacles in operating the first stage at such low temperatures and pressures. At temperature appreciably below about 40° F. the viscosity of the olefin-acid mixture in the first stage builds up inordinately. This makes efficient first stage contacting difficult. Avoidance of subatmospheric pressures in alkylation operations is virtually a necessity for preventing positively the formation of dangerous mixtures of atmospheric oxygen with the light hydrocarbon vapors in process. Furthermore, subatmospheric vapor systems must be large and costly to handle the low density materials in any reasonable volume. Prudence, then, dictates that all system pressures must be at least atmospheric and, preferably at least slightly positive.

Our improved process makes it possible to operate the first stage at very low temperature, and thus suppress formation of undesirable polymer, while assisting to maintain fluidity of the first stage reaction mixture and keep a positive pressure at all places in the system.

Our improvement for a two stage alkylation operation comprises: injecting a recycled liquid phase hydrocarbon rich in propane from a later step of the process into said first stage reaction zone conjointly with said olefin reactant and said catalyst: maintaining the pressure on said first stage reaction zone sufficiently low for vaporizing propane from the resulting mixture at a temperature not substantially above about 35° F., thereby evolving vapors comprising propane from, and concomitantly chilling associated liquid phase in said first stage reaction zone to a temperature not substantially above about 35° F.; condensing said evolved vapors comprising propane from the first stage reaction zone; recovering a liquid phase hydrocarbon rich in propane from the condensate of said vapors comprising propane which evolved from said first stage; and returning sufficient of the recovered liquid phase propane-rich hydrocarbon to said first stage reaction zone for maintaining the pressure therein at least about atmospheric at a temperature not substantially above about 35° F.

The direct injection of the very mobile liquid propane into the first stage mixture imparts fluidity thereto, even at temperatures as low as 20° to minus 30° F. Resulting vaporization of the propane assists in agitating the first stage reaction mixture efficiently for the contact of the hydrocarbons with the catalyst therein. The liquid propane injected into the first stage reaction zone must, additionally, be in sufficient quantity and in sufficient quality (purity) to impart to the mixture a boiling point at least as low as +35° F. maximum, and preferably between about −20 and about +10° F., at a pressure at least atmospheric, and preferably just slightly higher, e.g., 1–5 p.s.i.g. or higher. The molal quantity of liquid propane being recycled from recovery to the first stage reaction zone relative to the total molal quantity of all hydrocarbon materials from other sources (including liquid propane) entering the first stage reaction zone, is broadly between about 0.1:1 and about 4:1. Generally, it is about 1.5 mols per mol of said other hydrocarbon components fed to said zone for a liquid phase olefin feed containing 50 liquid volume percent olefin and 50 liquid volume percent propane and being handled at an olefin:acid mol ratio in the preferred range with a pressure of about 5 p.s.i.g. and at a temperature at least as low as 20° F. On a saturated hydrocarbon basis, the ratio of mols of liquid propane to total mols of saturated hydrocarbons having boiling point above propane entering the first stage must be about 3:1 minimum, and preferably it will be higher, to obtain the desired low first stage temperature efficiently at a substantial positive pressure.

Of course, it will be understood that the precise recycle flow rate of liquid propane to the first stage reaction zone will be affected primarily by: those elements which affect the heat of reaction and the proportion of liquid propane to other hydrocarbons which enter with the fresh olefinic feed to said zone (should that feed be in the liquid phase as is preferred for efficiency and economy in the practice of our process), and it will be affected secondarily by the amount of sensible heat to be abstracted from the first stage feeds and products. Such determining elements include the proportions of olefin and of paraffins in a particular olefin feed, the initial temperature of feeds and final temperature to be reached at a particular positive pressure, the olefin:catalyst mol ratio, whether or not precooling of the feeds is practiced and to what extent, etc.

Another benefit of our invention includes that of permitting use of an olefin feed containing some ethylene, e.g. 0.1–10 liquid volume percent or even more, because the very high absorption rate of higher molecular weight olefins relative to that of ethylene under the propane vaporizing conditions of our first stage operation causes the ethylene to remain unabsorbed in the catalyst substantially completely in the first stage reaction zone. Thus it does not enter the second stage zone wherein it is highly deleterious to good "acid life." Accordingly, the investment and operating cost of "de-ethanizing" fractional distillation of the olefin (for elimination of ethylene and ethane) can be avoided.

A further benefit of our operation, particularly when operating with a propylene-propane olefin feed containing very little (e.g., 5 liquid volume percent or less) of other hydrocarbons having boiling point above propane, is the fact that the first stage conditions (pressure-temperature-propane recycle rate) can be established for evaporatively separating all or virtually all of the propane present in the first stage very rapidly from the resulting rich catalyst phase containing absorbed olefin. Accordingly, no contact time between liquid hydrocarbons and the catalyst phase need be maintained to achieve a liquid-liquid phase separation by settling, and degradation reactions are thus further suppressed.

Advantageously the olefin feed to the absorption zone of our process is a propylene-containing feed and, ordinarily, because of the difficulty in separation, it will contain propane in a proportion of 20–80% propylene to 80–20% propane and frequently propane:propylene in a mol ratio of about 1:1. Promotional butylene (3–20% or even more based on the total olefin in the feed) is desirable in propylene alkylation. While mixtures containing essentially $C_5+$ olefins and paraffins are amenable to our type of processing, the importance of higher alkylates made from such olefins is not as great as that of butylene and propylene alkylates. Alkylates are presently in demand for high quality automotive fuels.

Figures 1, 2, 4, and 5 of the drawings show various embodiments of my invention in the form of process flow diagrams. Figures 3 and 6 are flow diagrams showing details of suitable first stage reaction zones.

In the embodiment hereinafter described with respect to Figure 1, vapors comprising propane from the first stage and from the second stage reaction zones are condensed together and the propane for recycle to the first stage reaction zone is recovered from the resulting mixed condensate. Figure 4 of the drawing shows a scheme wherein the second stage reaction zone is cooled by the indirect cooling of evaporating propane, and the condensate of such evaporation and of first stage propane evaporation is returned to both reaction zones for refrigeration of said zones.

Figure 2 of the drawings shows the invention applied to an autorefrigeration system. Figure 5 of the drawings shows the invention applied to an effluent refrigeration system wherein volatile hydrocarbon vapors from the second stage reaction zone and vapors comprising propane from said first stage reaction zone are condensed separately, the resulting condensates are neutralized, and the neutral condensates are fractionally distilled to recover liquid phase propane-rich hydrocarbon for recycle to and injection into said first stage.

In the embodiments shown by the drawings the catalyst used in all cases is the preferred one, namely sulfuric acid. It will be understood that the various vessels shown in the drawings are shown in the singular for simplicity, but can stand for one or more of the same kind of vessels, pumps, tanks, etc. connected in series or parallel arrangement as necessary or desired. For simplicity only the major equipment is represented in the drawings. Pumps, most valves, instruments, surge tanks, condensers, reflux returns and reboilers are not shown but are to be employed in conventional manner wherever necessary or desirable. It should be understood also that in the embodiments wherein the reactor is of the type employing internal recirculation, e.g., the so-called Stratco contactor, such reactor can be replaced with a conventional pump and time tank wherein the average time of contact of the second stage alkylation mixture is generally between about 5 and 45 minutes, and advantageously, 5 to 20 minutes. Unless otherwise specified, all temperatures in this application are in degrees Fahrenheit, all percentages are mol percentages, and all volumes are measured as liquid volumes regardless of whether they are in liquid or vapor state in process.

Referring to Figure 1, a liquid olefin feed of 50 volume percent propylene and 50 volume percent propane enters mixer 27 through line 18 together with recycle catalyst from line 21 and recycle propane condensate through line 25, which is flashed to a low but positive pressure by pressure reducing valve 26. The olefin:acid mol ratio used is 0.5:1. The mixer discharge, made mobile by said liquid propane input, flows into separator 28. The mol ratio of recycled liquid propane to hydrocarbons entering the mixer from the other feeds is about 1.5:1 and the mol ratio of propane to paraffins boiling above propane is greater than 3:1 whereby the pressure in separator 28 is established at about 5 p.s.i.g. at a temperature of about minus 20° F.; the mixer and separator constitute the first stage reaction zone. Catalyst (92% $H_2SO_4$) rich in absorbed olefins is withdrawn from separator 28 by means of line 18 and discharged into alkylation contactor 17. Any liquid hydrocarbons that separate from the catalyst and remain unvolatilized can be withdrawn from the separator by means of line 30. Hydrocarbon vapors rich in propane pass through line 32, knockout pot 42, header 43, and into the suction of compressor 45. Advantageously, the individual feeds to mixer 27, particularly the olefin and recycled propane feeds, can be precooled to a temperature below 35° F. e.g. 0° to 20° F. or lower, by conventional means not shown.

Make-up isobutane and isobutane concentrate recycled from fractionation enter through lines 10 and 12, respectively, pass through heat exchanger 13, out line 14, are blended with flashed cooled remaining liquid from depropanizer bottoms flashing entering line 16, and this hydrocarbon mixture discharges into alkylation contactor 17 by means of inlet 15. Contactor 17 constitutes the second stage reaction zone.

In the contactor these hydrocarbons are intimately contacted at about 40° F. with the rich acid entering from line 18, and the resulting reaction mixture is discharged through line 19 into acid settler 20. Here catalyst settles out and is withdrawn through line 21 for recirculation to first stage mixer 27. To maintain catalyst strength at the desired 92% strength catalyst is purged from line 22 and made up with fresh 99% sulfuric acid entering the system through inlet 23.

Separated hydrocarbon effluent from settler 20 is discharged through line 33 under a back pressure of about 60 p.s.i.g. which maintains contents of the contactor and acid settler in liquid phase. This effluent passes through pressure reducing valve 34 wherein flashing ensues and the mixed chilled liquid and vapor are discharged through cooling coils 35 of contactor 17 out line 36 and into vapor-liquid separator 37 which is at 5 p.s.i.g.

Vapors separated in separator 37 are withdrawn through pipe 39, knockout pot 42, header 43 and into the suction of compressor 45, together with additional vapors admitted from line 40. After compression in compressor 45 the mixed vapors pass through line 46 and are totally condensed in condenser 47. The condensate passes through line 48, is warmed in heat exchanger 49, and discharges through line 50 into depropanizer 52.

Herein a fractional distillation is done in conventional manner to separate a liquid bottoms fraction consisting preponderantly of isobutane, and sharply cut therefrom, a propane distillate which is withdrawn through product line 53. Part of the propane product is recycled through line 25 as hereinbefore described to mixer 27 for first stage cooling, pressure maintenance, and viscosity reduction. The balance is withdrawn from the system through line 54 for LPG or other use.

Depropanizer bottoms pass through line 55, heat exchanger 49, line 56, cooler 57, then through pressure reducing valve 58 whereby they are flashed to compressor suction pressure. The resulting chilled vapor-liquid mixture passes into flash drum 59. The chilled remaining liquid from this flashing is recycled to the contactor through line 16 to cool it and to supplement the isobutane feed thereto. The flashed vapors are discharged through line 40, knockout pot 42, header 43, and into the suction of compressor 45.

The liquid separated in vapor-liquid separator 37 passes through line 38 and is utilized to chill hydrocarbon feeds in exchanger 13. Thus used, it passes through line 60 and into mixer 63, together with a recirculating stream of aqueous caustic soda solution from line 64. The mixture discharges into caustic settler 65 wherein aqueous caustic soda settles out for recirculation and is purged and made up by means not shown. The so-neutralized crude alkylate is then discharged through line 66 into mixer 67 together with a stream of water recirculating through line 68. Mixer 67 discharges into water settler 69 wherein water settles out for recirculation and is purged and made up by means not shown. Advantageously, the water washing is conducted with warm water and/or warm hydrocarbon to secure the most beneficial washing effects, the warming means not being shown.

The water washed hydrocarbon is then discharged into deisobutanizer 72, a fractional distillation unit operated in conventional fashion to produce a highly concentrated isobutane distillate for recycle to the reaction zone through line 12 and a liquid bottoms fraction of normal butane and higher which is discharged through line 73 and into product debutanizer 74.

Herein the material is fractionally distilled in conventional fashion to give an overhead distillate of high purity normal butane, which is discharged through line 75, and a liquid bottoms product of higher boiling material which passes through line 76 and into alkylate fractionator 77. In alkylate fractionator 77 fractional distillation is conducted to give an overhead distillate of light alkylate having an end boiling point of 338° F., which is withdrawn through line 78, and a liquid bottoms fraction of alkylate bottoms useful for cracking stock or the like.

Referring to Figure 2, an olefin feed of 49% propylene, 47% propane, 0.2% ethylene, 1.8% ethane, and 2% hydrocarbons having boiling point above propane (all liquid volume percentages) enters mixer 107 through line 103 together with recycle 92% sulfuric acid catalyst from line 99 and recycle propane distillate through line 104. The olefin:acid mol ratio is 0.5:1 as fed to vessel 107. The propane distillate is flashed to a low but positive pressure by pressure reducing valve 105, then the resulting flashed vapor-liquid mixture discharged into vessel 107 by means of sparger 106. The mol ratio of recycle liquid propane to the hydrocarbons entering vessel 107 from the olefin feed is about 1.5:1 and the mol ratio of propane to higher boiling paraffins here is above 3:1 whereby the pressure therein is established at about 5 p.s.i.g. at a temperature of about minus 20° F. Liquid material spills over baffle 108 and the dense catalyst phase, rich in absorbed olefins except ethylene which has been rejected with the vapors, is withdrawn by means of line 109 and discharged into alkylation reactor 90. No liquid hydrocarbons readily separatable from the rich acid by gravity settling remain unvolatilized in vessel 107. Rich acid from the first stage can be sampled by means of line 114. Hydrocarbon vapors rich in propane pass through line 115, knockout pot 126, header 127, and into the suction of compressor 128.

Make-up isobutane (containing about two liquid volume percent propane) and isobutane concentrate recycled from fractionation hereinafter described enter through lines 116 and 117, respectively, pass through heat exchanger 118, and then through line 120. While these hydrocarbons can be distributed to all the agitated zones of reactor 90 by means of lines 122, 123, and 124, in this instance all the isobutane feed is sent through line 124. A "preflash" zone (not shown) for isobutane, ahead of the zone supplied by line 124, can be used here, if desired. Reactor 90 is divided into a plurality of zones by baffles 92, 93, 94, and 95. The last three enumerated baffles form reaction zones which are agitated by mixers 96, 97 and 98. In this reactor sulfuric acid catalyst settles out between baffles 92 and 93 is withdrawn through lines 96 and 99, and passed into the first stage as hereinbefore described. Acid is purged from the system through line 100 and make-up high strength (99%) sulfuric acid catalyst is added at inlet 102 in an amount sufficient to sustain catalyst volume and strength.

The rich acid returning from the first zone in line 109 passes into inlets 110, 112 and 113 of reactor 90. Pressure on reactor 90 is about 5 p.s.i.g., average temperature is 45° F., and hydrocarbon vapors generated in this reactor are withdrawn through line 125 into knockout pot 126, header 127 and into the suction of compressor 128. Separated liquid hydrocarbons flow over baffle 92, are withdrawn from the reactor through line 119, then are used in indirect heat exchange in exchanger 118 and pass to neutralization through line 138.

Compressor 128 delivers the mixed hydrocarbon vapors through line 129 into total condenser 130. The resulting condensate is passed through line 132 into depropanizer 133. Herein a fractional distillation is done in conventional manner to separate the liquid bottoms fraction consisting preponderantly of isobutane, and sharply cut therefrom, a condensed propane distillate which is withdrawn through product line 134. Ethylene is separated from this condensate as an uncondensed vapor. Part of the propane product is recycled through line 104 as hereinbefore described to vessel 107 for first stage cooling, pressure maintenance and viscosity reduction. The balance is withdrawn from the system through line 135 for L.P.G. or other use. Depropanizer bottoms pass through lines 136 and 117 into the inlet of cooler 118 as hereinbefore described.

Alkylate flowing through line 138 passes into mixer 139 with a recirculated stream of aqueous caustic soda solution from line 140. The mixer discharges into caustic settler 142 wherein aqueous caustic soda settles out for recirculation and is purged and made up by means not shown. The crude alkylate is then discharged through line 141 into mixer 143 with a stream of water recirculated through line 144. Mixer 143 discharges into water settler 145 wherein water settles out for recirculation and is purged and made up by means not shown. Advantageously the water washing is conducted with warm water and/or warm hydrocarbon to secure the most beneficial washing effects, the warming means not being shown.

The water washed hydrocarbon is then discharged into product debutanizer 147, a fractional distillation unit operated in conventional fashion, to produce a concentrated $C_4$ and lower cut distillate, and a liquid bottoms fraction of alkylate which passes through line 152 into alkylate fractionator 153. The $C_4$ cut passes through line 148 into deisobutanizer 149 wherein it is fractionally distilled in conventional fashion to give an overhead distillate of high purity isobutane which is discharged through line 137 for recycle to the second stage reaction zone and a liquid bottoms fraction of predominantly normal butane which is discharged from the system through line 150.

In fractional distillation tower 153 distillation is conducted to give an overhead of light alkylate for automotive fuel having an end boiling point of 400° F., which is withdrawn through line 154, and a liquid bottoms fraction of heavy alkylate, which is withdrawn through line 155. Ordinarily, however, tower 153 can be dispensed with when operating for automotive fuel having end point above 400° F.

Referring to Figure 3, there is shown an embodiment whereby second stage reaction vessel 90 is adapted to embody a first stage reaction zone also—this adaptation making unnecessary a separate vessel such as vessel 107 for the first stage contacting. The equipment items bearing the same numbers as those in Figure 2 are identical in structure to the corresponding equipment items in Figure 2.

Accordingly, vessel 90 is divided into a plurality of zones by baffles 91, 92, 93, 94, and 95. Three of these zones are agitated by mixers 96, 97 and 98 as illustrated. The zone illustrated to the left of baffle 95 serves as the first stage reaction zone, and this zone is fed by recycle sulfuric acid entering line 96a (suitably purged at outlet 100a and made up at inlet 102a), recycled propane from the depropanizer overhead entering through line 104a and pressure reduction valve 105a, and the olefin feed entering line 103a. Make-up and recycle isobutane enters the system through line 120 and enters the reaction zone through inlet 123, although it is to be understood that some part of it can be admitted through line 122 also, if desired. While the olefin feed can be in vapor or in liquid phase for the practice of our invention, liquid phase olefin feed is preferred for efficiency and economy.

Hydrocarbon vapors from the first stage reaction zone (i.e., the zone agitated by mixer 98), the second stage reaction region (i.e., the zones agitated by mixers 96 and 97), and the settling zones (to the right of baffles 92 and 93) pass through outlet 125 and eventually to the compressor as in Figure 2. Liquids discharging from the first stage reaction zone are collected between baffles 91 and 95. Unevaporated hydrocarbons can be removed here as a discrete liquid phase by means not shown. The denser rich acid discharges through line 156 and into inlets 157 and 158 for second stage reaction. Acid for recycle is withdrawn through line 96a, and crude alkylate for heat exchange, neutralization, and fractionation is withdrawn through line 119.

Referring to Figure 4, an olefin feed of propylene and propane passes through line 163 into mixing tank 160 agitated by mixer 162 together with recycle catalyst from line 164 and recycle propane distillate from line 165. The propane distillate is flashed to a low but positive pressure by positive reducing valve 166. The rich acid, rendered mobile by the propane input, flows in separator 169, the mol ratio of propane to all other hydrocarbon components in mixer 160 being about 3:1 whereby the pressure in mixer 160 and in separator 169 is established at about 5 p.s.i.g. with the temperature in each vessel being about minus 20° F. The mixing tank and separator here constitute the first stage reaction zone. Catalyst rich in absorbed olefins is withdrawn from separator 169 by means of line 177 and discharged into alkylation contactor 178 which constitutes the second stage reaction zone. Liquid hydrocarbons that remain unvolatilized can be withdrawn from the separator by means of line 176. Hydrocarbon vapors rich in propane pass through lines 167, 170, 172, and 174 into vapor liquid separator 175.

Make-up isobutane and isobutane concentrate recycled from fractionation enter the system through line 182, are cooled in heat exchanger 183, and pass into the contactor through line 184. With the make-up isobutane entering line 179 there is included a small amount of promotional butylene, 10 mol percent based on the amount of propylene entering the system through line 163.

In contactor 178 the hydrocarbons are intimately contacted at about 40° F. with the rich acid entering from line 177, and the resulting reaction mixture is discharged through line 196 into acid settler 197. Here catalyst settles out and is withdrawn through line 164 for recirculation to first stage mixer 160 after having been suitably purged through outlet 98 and made up through inlet 199 to keep catalyst strength and volume substantially constant during the operation.

Reactor 178 is cooled indirectly by a stream of liquid propane which passes through line 186 and is flashed to a low pressure but positive pressure through valve 187, the resulting chilled liquid and vapor mixture passing through coils 188 wherein additional propane is vaporized from the exothermic heat of the second stage reaction. The resulting liquid-vapor mixture passes through lines 189 and 174, then into vapor-liquid separator 175.

Separated vapors from vessel 175 pass through line 190, compressor suction trap 191, and into compressor 192. The compressed vapors pass through line 193, into condenser 194, and the resulting material discharges into vessel 175 by means of line 195. Liquid hydrocarbon, almost entirely propane, is delivered from separator 175 through line 185 for distribution to the first stage mixer through line 165 and to the second stage heat exchanger through line 186. To maintain propane purity a small purge of hydrocarbons is withdrawn from the system through line 181. This can be fractionally distilled in conventional manner in a depropanizer (not shown) for recovery of propane and incidental higher boiling saturated materials such as isobutane which can occur in the feed in minor quantities. The separated crude alkylate passes through line 200 into mixer 202 with a recirculating stream of aqueous caustic soda from line 203. The mixer discharges into caustic settler 204 wherein aqueous caustic soda settles out for recirculation and is purged and made up by means not shown. The neutralized crude alkylate is then discharged through line 205 into mixer 206 with a stream of water recirculating through line 207. Mixer 206 discharges into water settler 208 wherein water settles out for recirculation and is purged and made up by means not shown. Advantageously, the water washing is conducted with warm water and/or warm hydrocarbon to secure the most beneficial effects, the warming means not being shown.

The water washed hydrocarbon is then discharged into product debutanizer 210, a fractional distillation unit operated in conventional fashion to produce a $C_4$ and lower boiling distillate and a liquid bottoms fraction of alkylate which is withdrawn through line 215. Additional make-up isobutane containing some normal butane is admitted to the system through line 211 for rectification in tower 210.

$C_4$ and lower hydrocarbons pass through line 212 into deisobutanizer 213. This is a fractional distillation unit operated in conventional fashion to produce a highly concentrated isobutane distillate which is recycled to the reaction zone through line 180 and a liquid bottoms fraction of principally normal butane which is discharged from the system through line 214.

The whole alkylate from line 215 is fractionally distilled in tower 217 to give an overhead distillate of light alkylate suitable for aviation fuel and having an end boiling point of 338° F., which is withdrawn through line 218, and a liquid bottoms fraction of alkylate bottoms which is withdrawn through line 219. Alternatively, the whole alkylate, which has an end boiling point below 400° F., can be used as automotive fuel without distillation in tower 217.

Referring to Figure 5, an olefin feed of propylene, propane, butylenes, isobutane, and normal butanes enters first stage reaction zone vessel 232 by means of line 230. Also entering the first stage reaction vessel is a recycled flow of propane from fractional distillation entering from line 244 and being flashed to a lower pressure but positive through pressure reducing valve 245, a recycle flow of propane-rich condensate from line 259, also being flashed by reduction to first stage pressure through pressure reducing valve 261, and a recycle flow of acid catalyst from line 246 which has been purged of spent catalyst (92% $H_2SO_4$) through line 266 and made up to alkylation strength and volume through line 241 with 99% $H_2SO_4$.

Sufficient propane from recycle and from olefin feed enters vessel 232 to give a mol ratio of propane to all other hydrocarbon components (including olefins) entering at about 3:1 whereby pressure in vessel 232 is established at about 5 p.s.i.g. at a temperature of about minus 20° F. The catalyst rich in absorbed olefins passes over baffle 233 and settles out in the zone to the left of the baffle. Then it is withdrawn through line 260 and discharged into alkylation contactor 262 (which constitutes the second stage reaction zone). Liquid hydrocarbons flowing over the baffle are withdrawn from the first stage through line 292. Hydrocarbon vapors rich in propane pass through line 247 into knockout drum 248 and suction line 249 of compressor 250. The compressed vapors are discharged through line 252 into condenser 253. The condensate passes through line 254 into accumulator drum 255. A portion of the condensate is withdrawn from the accumulator drum through lines 256 and fed to depropanizer 303. The balance is chilled in exchanger 258 by heat exchange with alkylate as hereinafter described, then recycled to the first stage reaction zone through line 259 and valve 261.

The second stage of the reaction zone, contactor 262, is fed by isobutane from line 263 and rich catalyst entering from line 260. In the contactor intimate mixing of the reaction mixture is accomplished, and the product is discharged through line 264 into acid settler 265. Herein catalyst settles out and is recirculated to the first stage through line 246 as hereinbefore described.

Separated hydrocarbon effluent from settler 265 passes through line 267 and pressure reducing valve 268 wherein it is flashed by pressure reduction to yield a chilled vapor-liquid mixture. This vapor-liquid mixture is discharged through reactor cooling coils 269, out line 270, and into vapor-liquid separator 272.

The cooled liquid is withdrawn through outlet 273. A portion thereof is passed through line 274 and into exchanger 275 for cooling the isobutane feed to the second stage reaction zone, thence out line 277 and into line 283 for neutralization as hereinafter described. The balance of the cool hydrocarbon liquid is sent by means of line 276 into heat exchanger 258 wherein it cools the propane-rich condensate being recycled to first stage reaction zone vessel 232. Thus heat exchanged, the alkylate is withdrawn from exchanger 258 through line 282 and fed to neturalization through line 283.

Vapors from vapor-liquid separator 272 pass through line 284 into suction trap 285, then into inlet 286 of compressor 287. The resulting compressed vapors discharge through line 288 into condenser 289, and the resulting condensate passes through line 290 and fed into depropanizer 303.

In depropanizer 303 the condensed vapors from lines 256 and 290 are fractionally distilled in conventional manner to separate a liquid bottoms fraction of $C_4+$ hydrocarbons, and sharply cut therefrom a high purity propane distillate which is withdrawn through line 304. Part of the propane distillate is recycled to the first stage reaction zone through line 244 as hereinbefore described to assist in cooling, pressure maintenance, and viscosity reduction of the materials in vessel 232. The balance of the propane is purged from the system through line 301 for L.P.G. fuel gas, or other use. The liquid bottoms fraction of $C_4+$ hydrocarbons, preponderantly isobutane, pass through lines 305, and 316, heat exchanger 275 and line 263 into second stage reaction zone 262, together with deisobutanizer overhead distillate production obtained as hereinafter described.

The hydrocarbons from lines 283 and 292 pass into mixer 293 with a recirculating stream of aqueous caustic soda solution from line 294. The mixture discharges into caustic settler 295 wherein aqueous caustic soda settles out for recirculation and is purged and made up by means not shown. The neutralized crude alkylate discharges through line 296 into mixer 297 with a stream of water recirculating through line 298. Mixer 297 discharges into water settler 299 wherein water settles out for recirculation and is purged and made up by means not shown.

The neutralized, water washed hydrocarbon passes through line 300 into deisobutanizer 306. A supplemental saturated $C_4+$ hydrocarbon feed containing isobutane is fed to the deisobutanizer through line 302. In the deisobutanizer the material is fractionally distilled in conventional fashion to give a highly concentrated isobutane distillate, which is sent to the second stage reaction zone through lines 307 and 316, heat exchanger 275, and line 263, and a liquid bottoms fraction of normal butane and heavier (i.e., higher boiling than normal butane), which is withdrawn through line line 308 and into product debutanizer 309.

Herein the material is fractionally distilled in conventional fashion to give an overhead distillate of high purity normal butane which is discharged from the system through line 310 and a liquid bottoms product of higher boiling material which passes through line 312 into alkylate fractionator 313. In fractionator 313 fractional distillation is conducted to give an overhead distillate of light alkylate for aviation fuel having an end boiling point of 338° F., which is withdrawn through line 314, and a liquid bottoms fraction of heavy alkylate which is withdrawn through line 315.

Referring to Figure 6 there is shown a first stage reaction zone eminently suitable for pre-chilling first stage recycle acid and eliminating ethylene by virtue of the high absorption rate of propylene and higher olefins as compared to ethylene in the cooled recycled acid. Vessel 325 is the first stage reaction zone, and it is equipped with baffles 326 and 327, inlets 328, 329, 332 and 334, spargers 330, 333 and 335, and outlets 336, 337, and 347.

Recycle alkylation acid from the second stage reaction zone enters vessel 325 through inlet 328 together with a recycle of propane-rich condensate entering inlet 329. The propane-rich condensate is flashed to first stage pressure of about 5 p.s.i.g. by means of pressure reducing valve 346 in recycle line 345. The spargers serve to distribute vapor and liquid phase feeds to the first stage reaction zone.

To the left of baffle 326 the cooled propane flow pre-cools recirculated acid to about 10° F. The precooled material overflows baffle 326 into the olefin absorption zone between the baffles. Additional flashed propane liquid-vapor mixture is admitted to the olefin absorption zone through inlet 332, and an olefin feed of ethylene, propylene, propane, and butylenes enters through inlet 334. Liquid phase materials decant over baffle 327, and the dense rich acid is withdrawn from the first stage reaction zone by means of outlet 336. Any liquid hydrocarbons that remain can be withdrawn from vessel 325 by means of line 347.

Hydrocarbon vapors rich in propane pass through outlet 337 into compressor 338. The compressed vapors pass through line 339 into condenser 340, then are discharged through line 342 into separator 343. A portion of the resulting propane-rich condensate is withdrawn from the separator through line 345 and flashed to first stage pressure of about 5 p.s.i.g. through pressure reducing valve 346 to secure refrigeration and mobility of the first stage zone materials. The light ends, that is preponderantly ethylene and propane, are withdrawn through line 344 for other use. Adaptation of this system as the first stage in the alkylation unit saves the expense of de-ethanizing an olefin feed containing ethylene which would otherwise require an expensive fractional distillation.

We claim:

1. In a two stage isobutane-olefin alkylation process wherein, in a first stage reaction zone, a hydrocarbon feed containing a low molecular weight olefin reactant for alkylation is contacted with alkylation strength catalyst for absorption of the olefin in the catalyst, thereby forming a rich catalyst phase, and, in a second stage reaction zone, said rich catalyst phase is contacted with isobutane and said second stage reaction zone is refrigerated by the evaporation of hydrocarbons including propane and isobutane forming a second stage reaction zone vapor, said second stage reaction zone vapor is condensed and fractionally distilled separating a propane rich fraction and an isobutane rich fraction, and said isobutane rich fraction is passed to said second stage reaction zone, the improvement which comprises: injecting at least a part of said propane rich fraction into said first stage reaction zone conjointly with said olefin reactant and said catalyst, maintaining the pressure on said first stage reaction zone at least atmospheric and sufficiently low for vaporizing propane from the resulting mixture at a temperature between minus 30° and plus 20° F., thereby evolving vapors comprising propane from, and concomitantly chilling associated liquid phase materials in said first stage reaction zone to a temperature between minus 30° and plus 20° F., and combining said vapor from said first stage reaction zone with said vapor from said second stage reaction zone prior to condensing and fractionally distilling vapor from said second stage reaction zone whereby said vapors are condensed and fractionally distilled in admixture.

2. The process of claim 1 wherein the catalyst is sulfuric acid.

3. The process of claim 1 wherein the olefin reactant is a propane-propylene feed containing 0–5 liquid volume percent of other hydrocarbons having a boiling point above propane, and said first stage reaction zone is operated to separate evaporatively virtually all of the propane present therein from the resulting rich catalyst phase.

References Cited in the file of this patent
UNITED STATES PATENTS

| | | |
|---|---|---|
| 2,361,465 | Filbert | Oct. 31, 1944 |
| 2,441,249 | Ocon et al. | May 11, 1948 |
| 2,649,486 | Putney | Aug. 18, 1953 |
| 2,831,043 | Stiles | Apr. 15, 1958 |
| 2,888,500 | Pevere | May 26, 1959 |